(12) United States Patent
Van-Drentham Susman

(10) Patent No.: US 6,837,759 B2
(45) Date of Patent: Jan. 4, 2005

(54) PROPULSION APPARATUS

(75) Inventor: Hector Filippus Alexander Van-Drentham Susman, Inverurie (GB)

(73) Assignee: Rotech Holding Limited, Scotland (GB)

(*) Notice: Subject to any disclaimer, the term of this patent is extended or adjusted under 35 U.S.C. 154(b) by 0 days.

(21) Appl. No.: 10/363,953

(22) PCT Filed: Sep. 6, 2001

(86) PCT No.: PCT/GB01/03974

§ 371 (c)(1),
(2), (4) Date: Mar. 6, 2003

(87) PCT Pub. No.: WO02/20345

PCT Pub. Date: Mar. 14, 2002

(65) Prior Publication Data

US 2003/0153216 A1 Aug. 14, 2003

(30) Foreign Application Priority Data

Sep. 6, 2000 (GB) .............................. 0021822

(51) Int. Cl.⁷ .............................................. B63H 11/14
(52) U.S. Cl. ........................................................ 440/45
(58) Field of Search ............................................ 440/45

(56) References Cited

U.S. PATENT DOCUMENTS 3,683,622 A * 8/1972 Von Krusenstierna ....... 60/207
5,401,589 A * 3/1995 Palmer et al. ................. 429/13
5,833,444 A   11/1998 Harris et al. ................ 418/113

FOREIGN PATENT DOCUMENTS

DE 2426589 12/1975
DE 3545049 6/1987
GB 1048276 11/1966
GB 1447619 8/1976

OTHER PUBLICATIONS

Fock Harald: "Schiffstechnik—Teil 5" Soldat und Technik., vol. 14, No. 11, Nov. 1971,pp. 642–651, XP002185661 Umschau Verlag. Frankfurt Am Main.,DE ISSN: 0038–0989.

* cited by examiner

Primary Examiner—Jesus D. Sotelo
(74) Attorney, Agent, or Firm—Gifford, Krass, Groh, Sprinkle, Anderson & Citkoweki, P.C.

(57) ABSTRACT

The present invention provides a self-contained propulsion apparatus 1 suitable for a sub-sea ROV. The apparatus comprises:

a reactor vessel 2 having at least one inlet 3, 4 and an exhaust 7;

reservoirs 10, 11 for holding fuel and an oxidant material therefor, wherein the reaction products of said fuel and oxidant comprise steam; a remotely operable fuel and oxidant supply control device 12, 13; and a steam turbine 9 connected to the exhaust 7 so as to be driven by steam from the reactor vessel 2. The turbine 9 is drivingly connected 39 to a propulsion device 42 for propelling the ROV in use thereof. A degassing apparatus 17 is provided for substantially removing steam and any other gas phase reaction products, from the gas phase into the liquid and/or solid phase, downstream of the turbine 9.

21 Claims, 4 Drawing Sheets

PROPULSION APPARATUS

The present invention relates to a substantially self-contained propulsion apparatus suitable for use with sub-sea remotely operated vehicles (ROVs) and the like.

Unmanned ROVs are used extensively in the North Sea and elsewhere for the inspection and maintenance of sub-sea oil field installations. Remote interactive operation of robotic systems is also increasing in other areas such as space industry, nuclear industry and for work in other hazardous areas.

A typical ROV for submarine application is fed by a large umbilical which contains a power supply cable and a control cable. The control cable allows the operator to control the ROV movements from the deck of the mother shop and receive video and other relevant data from the ROV. ROVs are usually powered by high voltage electricity (600–700 V DC) or by hydraulic oil. High voltage electricity is dangerous in marine applications and requires particularly stringent safety precautions and good insulation.

Both electric and hydraulic oil power supply systems require a large and heavy umbilical to sustain and operate the ROV. The handling costs associated which these large cables is high due to the manpower requirements involved and the need for large hydraulic winches and umbilical cable handling drums. The size of the umbilical also affects the scope of application of the ROV as this becomes restricted in deep water due to the increased handling difficulties with ever greater lengths of heavy umbilical.

Small ROVs can be driven by battery; however, this requires the battery to be sealed into a robust protective container to protect against high pressure which can cause leakage. Due to their size and economic factors associated with the life of the battery these ROVs are only suitable for small-scale applications.

It is an object of the present invention to avoid or minimise one or more of the above problems or disadvantages of the prior art.

The present invention provides a self-contained propulsion apparatus suitable for a sub-sea ROV wherein said propulsion apparatus comprises:

a reactor vessel having at least one inlet and at least one exhaust;

at least one reservoir for holding, in use of the apparatus, supplies of each of a fuel and an oxidant material therefor, wherein the reaction products of said fuel and oxidant comprise steam, said reservoirs being in fluid communication with said at least one inlet of said reactor vessel;

at least one remotely operable fuel and oxidant supply control device formed and arranged for controlling supply of said fuel and oxidant from said reservoirs to the reactor vessel;

a steam driven drive device in fluid communication with said reactor vessel exhaust so as to be driven by steam from said reactor vessel in use of the propulsion system, said drive device being connected via a reduction gear means to a propulsion device for propelling said ROV in use thereof; and degassing apparatus formed and arranged for substantially removing steam and any other gas phase reaction products, from the gas phase into the liquid and/or solid phase, downstream of said drive device.

With a propulsion apparatus of the present invention, the power supply itself is essentially contained entirely on the ROV and thus the only functions required to be carried out by the umbilical, in additional to standard functions such as tethering and transmission of remote control signalling for operation of onboard equipment, steering etc, are remote control signalling for control of the fuel and oxidant supply devices. Thus the umbilical can be much lighter, more flexible, less complex etc. than umbilicals required for conventional ROVs and/or permit the use of a safer and more flexible form of power supply.

Various forms of steam driven drive device may be used in the apparatus of the invention, including steam engines with piston and cylinder units providing a reciprocating drive output in the first instance which can, if required, be converted via well known suitable mechanical linkage devices, into rotary drive. Preferably though there is used a drive device in which the steam is used to provide a rotary drive output substantially directly, such as for example, a positive displacement motor (PDM), or most preferably, a turbine. Particularly suitable PDMs are disclosed in WO 95/19488 and particularly suitable turbines are disclosed in WO 00/08293.

Other advantages of preferred forms of propulsion apparatus of the present invention that may be mentioned include the reduced size and weight of a steam turbine as compared with an engine, and the fact that it does not require the use of a starter motor thus further reducing weight and simplifying the whole system.

It will be appreciated that various forms of reactor vessel may be used in accordance with the present invention, including arrangements wherein any disproportionation or decomposition of the oxidant (as, for example, may occur with hydrogen peroxide) and/or any vaporisation of added water, are effected together with the combustion of fuel in a single reaction zone, as well as other arrangements wherein any such disproportionation and/or water vaporisation are effected in separate combustion, and decomposition and/or vaporisation zones within a single vessel and/or in separate vessels. The use of a single vessel can have advantages in reducing weight and size of the apparatus which are particularly valuable in subsea applications. On the other hand separate zones, and/or separate vessels, can facilitate greater control of the steam generation process and simplify construction and maintenance.

Advantageously, a suitable catalyst may be used to increase the rate and efficiency of the, or one or more of the, reaction processes and reduce the temperature in the reaction vessel and/or to minimise the production of undesirable by-products. Where the oxidant used is decomposed prior to reaction with the fuel, then a catalyst may be used to facilitate the decomposition reaction independently of any catalyst which may (or may not be) used for the reaction of the oxidant (for the sake of brevity references to 'oxidant' include the oxidant alone, as well mixtures of the oxidant and decomposition product(s) or decomposition product(s) alone, unless otherwise excluded by the context) with the fuel (which reaction may conveniently be referred to as combustion). Where catalysts are used separately for each of these processes, they may be the same or different. Where a catalyst is used for the combustion or oxidation reaction, the reaction may proceed without the need for ignition of the fuel-oxidant mixture, by simply heating the catalyst to a suitable temperature. By way of example, ethanol—oxygen mixtures typically burn at a temperature of the order of 900 to 1000° C., whilst the same mixture can react in the presence of a suitable catalyst such as platinum, at a temperature of the order of 270 to 300° C. Such reduced reaction temperatures have particular benefits in subsea applications due to the simplified design requirements and materials choice, including reduced heat insulation requirements, which result in more economical and compact and reduced weight construction.

In order to bring the catalyst up to a suitable temperature, there is generally provided an electrical pre-heater device, typically a resistance type electrical heater with a coil or cartridge element extending through the catalyst. Alternatively the catalyst could be supported on a mesh form heater element.

Various catalysts suitable for use in combustion or oxidation reactions and/or for hydrogen peroxide decomposition are well known in the art. Suitable catalysts generally include metals such as platinum, ruthenium and copper, and metal oxides such as cupric oxide (CuO), copper manganese oxide ($CuMn_2O_4$), or manganese oxide (MnO). Such catalysts are desirably in a spherical/cylindrical pellet form for use in a fixed bed chemical reactor. The catalyst is conveniently supported on alumina ($Al_2O_3$) or carbon. Other suitable supports for the catalyst include silica ($SiO_2$) and titania ($TiO_2$).

The use of a suitable catalyst also has advantages such as inhibiting production of undesirable by-products—such as carbon monoxide, as well as being substantially self-regenerating. Moreover contamination of the catalyst by 'dirty' compounds from the combustion reaction is generally negligible as normally only water, oxygen and carbon dioxide are produced, and fuels such as methanol or ethanol and oxidants such as hydrogen peroxide do not normally give rise to any contamination problems themselves, either.

In order to increase the production of steam for use in driving the steam turbine, water is advantageously added to the reaction mixture and/or to the reaction products in the reaction vessel, for example, in a combustion zone thereof, or more or less immediately downstream thereof, in a water vaporisation zone or vessel, part of the thermal energy generated in the combustion reaction being used to vaporise the added water. Conveniently the added water is obtained from that recovered in the degassification stage when spent steam is condensed back into water.

One convenient form of degassing means for removing steam from the gas phase comprises a heat exchanger formed and arranged for condensing steam exhausted from the drive device in use of the propulsion system, into liquid water. Conveniently at least part of the liquid water condensed in the heat exchanger is recycled back into the reactor vessel for subsequent revaporisation therein to produce additional steam for driving the drive device.

The particular form of degassing means required for use in the propulsion apparatus of the present invention will depend on inter alia the nature of the reaction products obtained from the reaction between the fuel and the oxidant. In the case of a fuel such as a lower alkyl alkanol or alkane, for example, ethanol or propane, or a dialkyl ether, with an oxidant such as hydrogen peroxide, the reaction products primarily comprise carbon dioxide and steam. Thus in addition to the use of a condenser for converting steam into liquid water, there may be a greater or lesser need (depending on how much of the carbon dioxide is dissolved in the condensed liquid water) for the use of a carbon dioxide removal system. A suitable device for the removal of the dissolved carbon dioxide is a degasser or absorber. Particular fuels having similar beneficial characteristics which may be mentioned include alkanols, preferably C1 to C4 alkanols (i.e. alkanols having from 1 to 4 carbon atoms in the alkyl chain), including methanol, ethanol, propanol and butanol, alkanes, preferably C1 to C6 alkanes, including methane, ethane, propane and butane, and dialkyl ethers, preferably those wherein alkyl is C1 to C4, including dimethyl ether and diethyl ether.

Another fuel that could be used is hydrogen which has the particular advantage that the only reaction product is steam so that there is no need for any degassing means other than a steam condenser and there are no problems associated with dangerous reaction products. The use of hydrogen does, however, require suitable safety measures in view of its high volatility.

Hydrogen peroxide is a particularly convenient oxidant as it provides both a source of oxygen for oxidising the fuel and providing thermal energy, and a source of water which can be converted into a steam. The hydrogen peroxide is moreover readily available commercially in different strengths and relatively easy and safe to handle (though particularly high strengths such as 85% or more, are preferably avoided due to their somewhat violent oxidising behaviour and tendency to attack various metal surfaces). In general, suitable strengths are in the range from 20% to 70%, advantageously 50% to 70%, for maximising power output, or, more generally, from 20% to 60%, preferably from 30% to 50%.

Various forms of reservoir may be used for the fuel and oxidant. In general these will be high pressure cylinders or "bottles". The reservoirs may be permanently mounted in the apparatus and provided with suitable connectors for replenishment from external supplies, or could be in the form of containers provided with releasable connector means for connection to the fuel and oxidant supply lines to the reactor vessel (or decomposition vessel etc as appropriate), so that when they are empty, they can simply be replaced with full ones.

It will be appreciated that a wide variety of steam driven drive device designs may be used in the apparatus of the invention. The operation thereof will also depend on the steam output from the reaction vessel which will in turn depend on the nature of the fuel and oxidant, as well as their rate of supply to the reaction vessel, any controls provided on the supply of the steam from the reaction vessel to the drive device etc. etc. In general though, where the steam driven drive device is in the form of a steam or gas turbine, this would typically be run at from 5,000 to 20,000, conveniently from 8,000 to 15,000 rpm. In order to reduce the drive output speed to levels suitable for use in hydraulic drive propulsion speeds there is generally employed a gearing system, conveniently a planetary reduction gearbox in order to obtain a substantial gearing down ratio. Whilst the turbine could, in principle, be used to drive a suitable propulsion device such as a propeller, substantially directly (through said gearing system), more conveniently the reduced speed turbine output is used to drive a pump in a pressurised fluid circuit so as to store the kinetic energy from the turbine (or other drive device) output in a pressurised fluid accumulator. Pressurised fluid from the accumulator may then be used in a much more flexible manner to drive one or more propulsion devices via suitable pressurised fluid positive displacement motors (PDMs—preferably one such as disclosed in any of U.S. Pat. Nos. 5,518,379, 5,833,444, and 5,785,509). Typically multiple propulsion devices are used on ROVs to provide steering of the ROV by means of selective activation of different propulsion devices, these being distributed in a suitable geometric array—for example activation of a port propulsion device and deactivation or reverse operation of a starboard propulsion device being used to turn to starboard. In general such PDMs are operated at from 250 to 400 rpm, preferably from 300 to 400 rpm.

Suitable pumps include PDM devices, such as those mentioned above, when operated as pumps. In such case the gearing systems would generally be chosen as to reduce the turbine drive output speed to a value in the above indicated range for PDM operation. Other suitable pumps include gear pumps, reciprocating piston and cylinder type pumps, vane pumps, and swash plate pumps, with the latter being particularly preferred.

The use of a pressurised fluid circuit for storing energy obtained from the steam driven drive device also has the advantage of enabling in a simple and convenient manner, use of this energy to operate various other equipment which may be provided on the ROV. Typically such equipment may include manipulators, cameras, video recording equipment, lights, pipeline tracking etc. Normally such equipment would include an alternator or like device for use in charging a battery for providing an electrical supply to electrical equipment on board the ROV such as video cameras and the like. A battery may also conveniently be used for operating control valves and/or pumps used in apparatus of the invention for various purposes such as fuel and oxidant supply to the reactor vessel where this is conveniently effected in a controlled manner by use of gear pumps; seawater circulation through a condenser system used to condense steam into liquid water; effluent discharge where spent reaction products such as water condensate are pumped overboard etc.

It will be appreciated that where the reaction products include carbon dioxide, at least part of this will be dissolved in the liquid water condensate. Having regard to the dilutions involved, the dissolved carbon dioxide would not normally present any safety problems and may be allowed to remain in the liquid water condensate being discharged overboard, conveniently by using a high pressure pump. Nevertheless where it is desired to reduce the carbon dioxide content of the effluent discharge, and/or desirably when part of the water condensate is being recycled to the reactor vessel, then carbon dioxide may be removed from the water to a greater or lesser extent using suitable degassing or scrubber devices which are well known in the art. A suitable scrubber device conveniently comprises a vacuum (low pressure) degassing column manufactured in stainless steel. The water is passed through the column over weir plates and cascades to disturb the flow, bringing water close to the surface where the gas can easily escape. The water can also be aerated causing the flow to be greatly dispersed into droplets to provide a large interface between the water and the atmosphere. An absorbent solution such as Lithium hydroxide (LiOH) could also be used to remove the carbon dioxide.

In a further aspect the present invention provides an ROV provided with a propulsion apparatus of the present invention.

In a further aspect the present invention provides a self-contained propulsion apparatus suitable for a sub-sea ROV wherein said propulsion system comprises:

a reactor vessel having at least one inlet and at least one exhaust;

at least one reservoir for holding supplies of each of a fuel and an oxidant material therefor, wherein the reaction products of said fuel and oxidant comprise steam, said reservoirs being connected to said at least one inlet of said reactor vessel;

at least one remotely operable fuel and oxidant supply control device formed and arranged for controlling supply of said fuel and oxidant from said reservoirs to the reactor vessel;

a steam turbine in fluid communication with said reactor vessel exhaust so as to be driven by steam from said reactor vessel in use of the propulsion system, said turbine means being connected via a reduction gear means to a propulsion device for propelling said ROV in use thereof; and degassing apparatus formed and arranged for substantially removing steam and any other gas phase reaction products, from the gas phase into the liquid and/or solid phase, downstream of said turbine.

Further preferred features and advantages of the invention will appear from the following detailed description given by way of example of a preferred embodiment illustrated with reference to the accompanying drawings in which.

Figure 1:
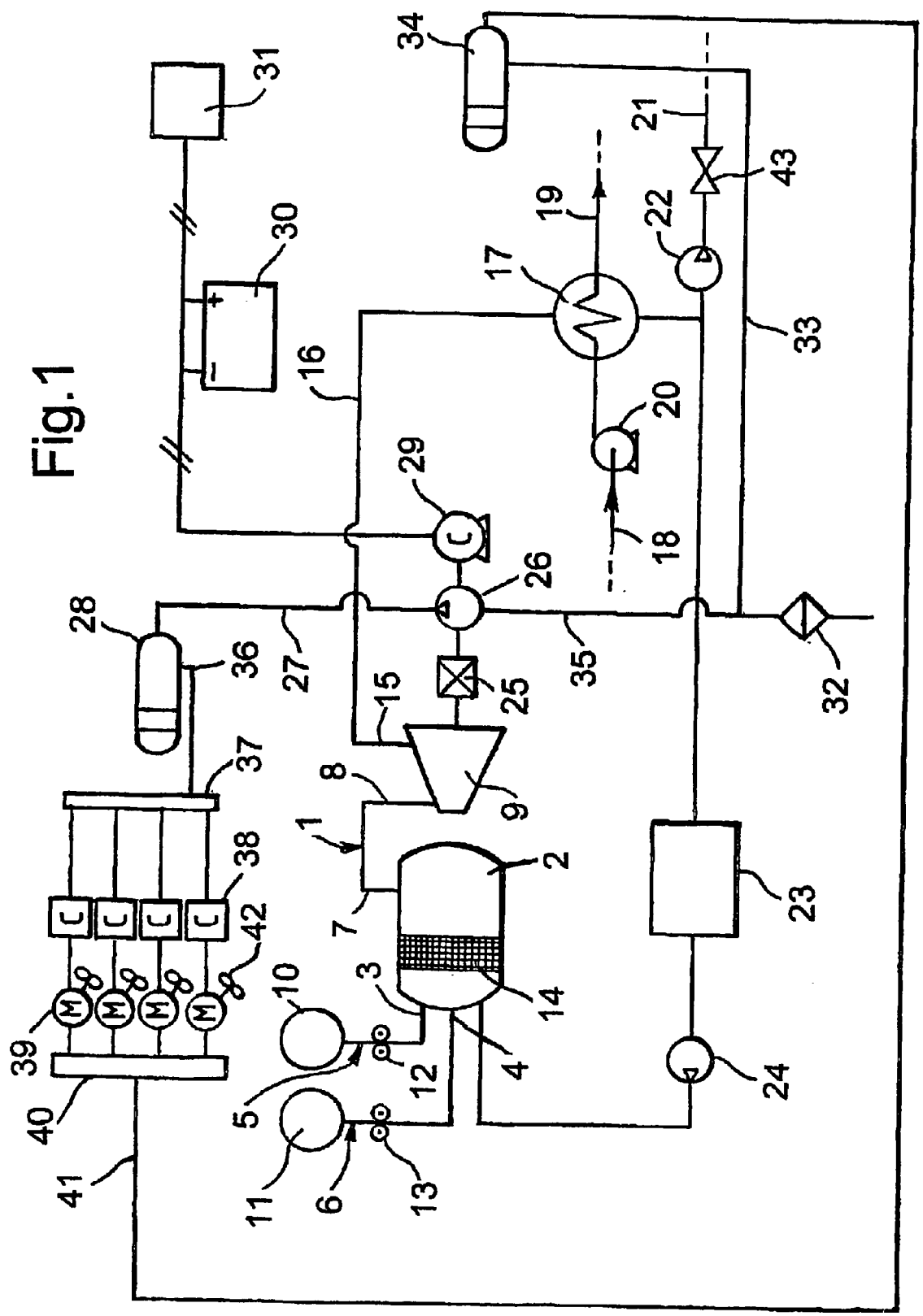
FIG. 1 is a schematic circuit diagram of a propulsion apparatus of the invention.

FIG. 1 shows an ROV propulsion apparatus 1 comprising a high pressure chemical reactor vessel 2 having fuel and oxidant inlets 3, 4 connected to fuel and oxidant supplies 5, 6 and a steam exhaust outlet 7 connected via a conduit 8 to a steam turbine 9. In more detail, the fuel and oxidant supplies each comprise a reservoir 10, 11 and a variable volume swash-plate piston or a diaphragm or gear pump 12, 13 for feeding fuel and oxidant to the reactor vessel 2 at a controlled rate. In order to maximise reaction efficiency inside the reactor vessel 2, the latter includes a fixed bed catalyst 14 composed of small catalytic pellets and various other vessel internals. Typical vessel internals could include components such as nozzles—to atomise the inlet flow, and a demister pad—to collate any entrained droplets of the reacting liquid and condense them back into the reactor.

The hot steam and gas mixture exhausted from the reactor vessel 2 is typically delivered to the first stage of the multi-stage turbine 9 at a pressure of around 40 Bar, passed through a control valve and then expanded in approximately 4 turbine stages to be finally discharged at around 1 Bar (or lower if possible, 10–15 mmHg). The spent steam is then passed from the turbine exhaust 15 along a conduit 16 through a condenser 17 with a heat exchanger through which is passed seawater from a seawater inlet 18 to a seawater outlet 19 with the aid of a pump 20.

The liquid water condensate from the condenser 17 is pumped overboard through a discharge outlet 21 with the aid of a water pump 22.

In order to reduce the turbine speed down from its typical running speed of 12000 rpm, it is connected to a planetary gear system 25 having a reduction ratio of 7 to bring it down to around 1870 rpm. This is then used to drive a swash plate hydraulic pump 26 in a hydraulic fluid circuit 27 to store the kinetic energy received from the turbine 9, as potential energy in a hydraulic fluid accumulator 28. Some of the kinetic energy from the turbine 9 is also used to drive an alternator 29 which converts it into electrical energy which is stored in storage batteries 30 which are used to power electrical equipment 31 aboard the ROV.

In more detail, the hydraulic fluid circuit 27 has a pressure compensator 32 which takes into account the varying ambient pressure at different depths below the surface. This ensures that the system remains in pressure equilibrium with its surrounding environment. The hydraulic fluid is passed through a supply conduit 35 to the hydraulic pump 26. (Technically, the pump could be electrically driven but it is more practical to hydraulically power it in this application). The fluid is then discharged under pressure to the accumulator 28. The accumulator 28 is connected via a conduit 36 to an inlet manifold 37. The inlet manifold 37 splits the hydraulic fluid to drive a plurality of individual motors 39 via control values 38 which act on individual motors 39. The fluid is then discharged from the motors 39 and gathered in an outlet manifold 40 where it is recycled to a second accumulator 34 via a return conduit 41. It is discharged from the second accumulator 34 via a connecting conduit 33 back into the supply conduit 28 connected to the hydraulic pump 26. The motors 39 are used to drive propellers 42.

Due to high ambient pressure in deep water application a non-return valve 43 is desirably included as a safety back-up to ensure that, if there were to be a pressure drop across the system, then the system would not be flooded with sea water. The positive displacement pump 22 itself will normally also tend to act as a pressure compensator and provide enough pressure to overcome the ambient pressure thereby ensuring that the system does not flood. Part of the water from the condenser is recycled back into the reactor vessel 2 by a recycle pump 24, where excess thermal energy produced by the oxidation reaction is used to convert the water into additional steam which can be used to increase the stream supply pressure applied to the turbine and increase the power output thereof.

Figure 2:
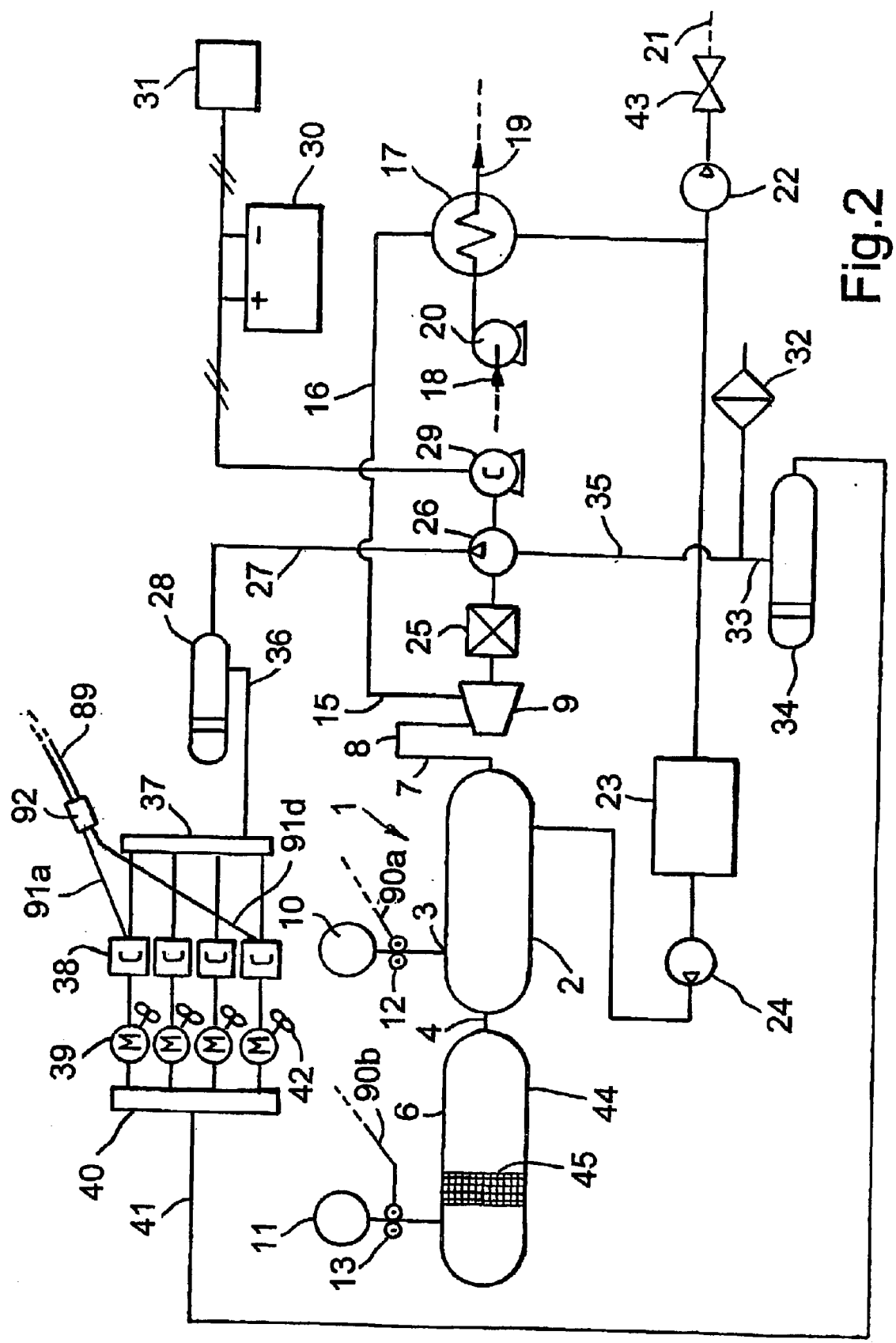
FIG. 2 is a corresponding diagram of a second embodiment.

The apparatus of FIG. 2 is generally similar to that of FIG. 1 with like parts being indicated by like reference numbers. In this case the oxidant supply 6 includes a separate decomposition vessel 44 containing a catalyst 45 for disproportionation of the hydrogen peroxide oxidant from the reservoir 11, prior to introduction thereof into the main reactor vessel 2 via the oxidant inlet 4.

Figure 3:
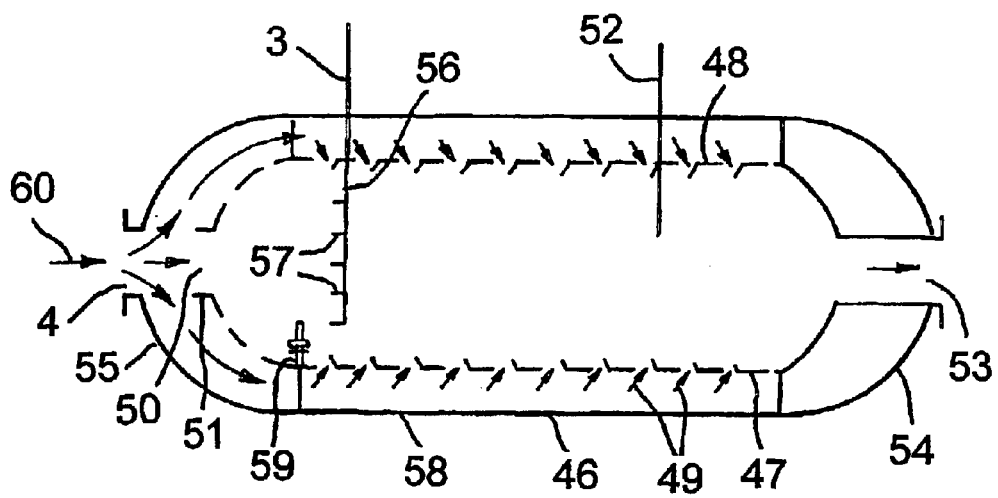
FIG. 3 is a detail schematic longitudinal section of a combustion chamber suitable for use in the apparatus of FIG. 2.

FIG. 3 shows one preferred form of reactor vessel 46 inside which is mounted concentrically an inner chamber 47 which has walls 48 with multiple spaced apart perforations 49. The inner vessel 47 has an inlet 50 with a restricted diameter neck 51 opposite a reactor vessel oxidant supply inlet 4, a water injection supply 52 slightly downstream thereof, and an outlet 53 which projects out of a downstream end 54 of the reactor vessel 46.

In proximity to an upstream end 55 of the reactor vessel 46 is a fuel inlet manifold 56 with an array of fuel injection nozzles 57 directed generally towards the reactor vessel inlet 52. Slightly in front of a lower end 58 of the fuel injection nozzle array 57 is provided a spark ignition element 59.

In use of the above embodiment, a supply of hydrogen peroxide decomposition products 60 is fed into the reactor vessel 46 via the inlet 4, and then enters the inner chamber 47 at various points along the length thereof via the inlet neck 51 thereof and the perforations 49. The oxidant entering the inner chamber 47 at the upstream end 55 is mixed with water droplets and then with a counter-current spray of fuel from the fuel nozzle array 57, the resulting mixture being ignited by the spark ignition element 59. As the burning fuel-oxidant mixture travels down the inner chamber 48 it is mixed with additional oxidant, thereby ensuring complete combustion of the fuel, before being exhausted out of the outlet 53.

Figure 4:
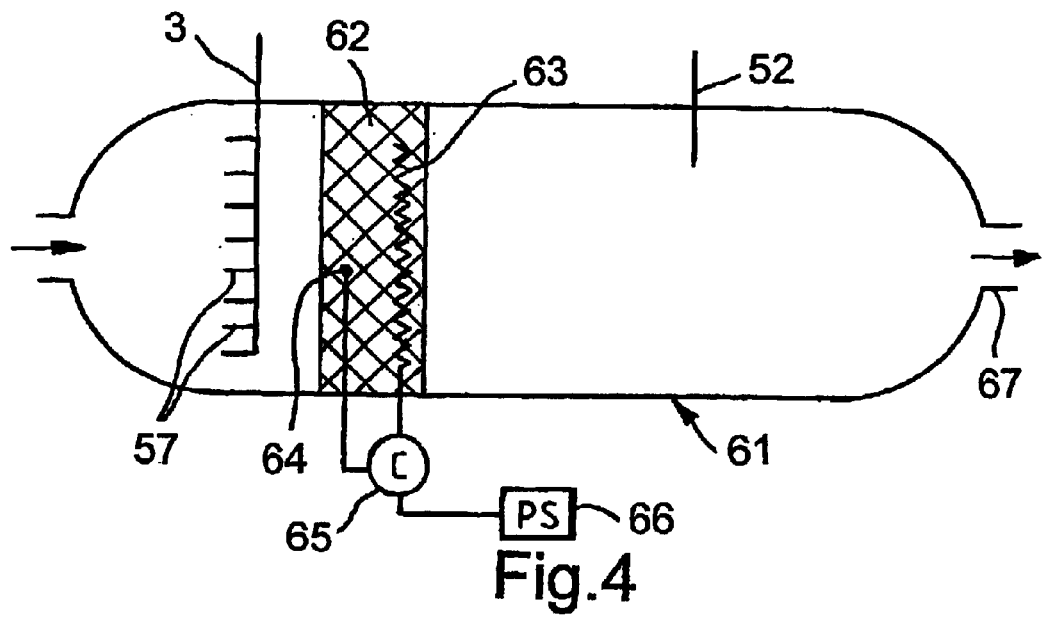
FIG. 4 is a detail schematic longitudinal section of an alternative form of combustion chamber for use in the apparatus of FIG. 2.

In the alternative form of reactor vessel 61 of FIG. 4, a fixed bed catalyst 62 is mounted downstream of fuel inlet manifold 56 with an array of fuel injection nozzles 57 similar to that in FIG. 3. The catalyst 62 is provided with an electrical heater element 63 and a temperature sensor 64 connected to a heater control unit 65. The heater element 63 is powered from an electrical power supply 66.

A water injection supply 52 is arranged downstream of the catalyst 62 to mix a spray of water droplets with the hot reaction products so as to vaporise the water into steam which is exhausted out the reactor vessel outlet 67.

Figure 5:
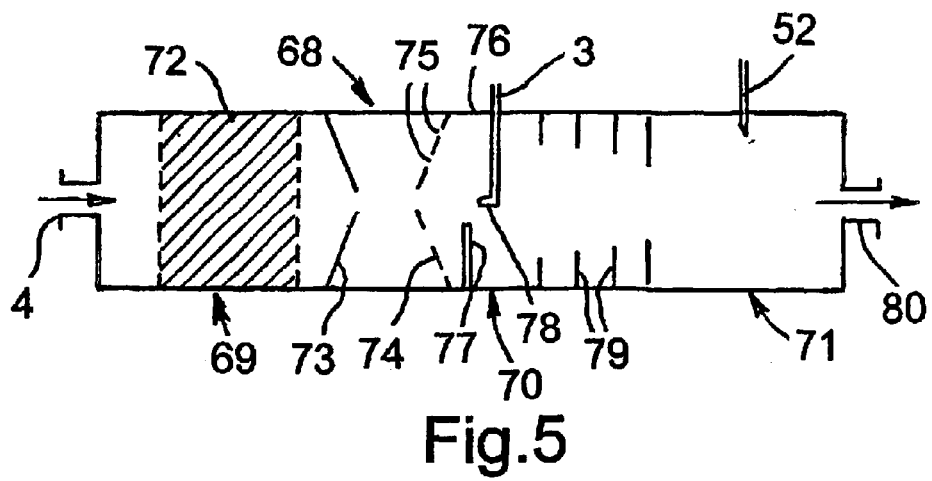
FIG. 5 is a detail schematic longitudinal section of a reactor vessel having separate decomposition, combustion and water vaporisation zones.

FIG. 5 shows another form of reactor vessel 68 which includes separate successive oxidant decomposition, combustion, and water vaporisation zones 69, 70, 71. A fixed bed catalyst 72 is mounted in the decomposition zone 69 downstream of an inlet 4 for hydrogen peroxide oxidant. Downstream of the catalyst 72 are provided first and second opposed frusto-conical baffles 73, 74. The first, compression, baffle 73 increases the velocity of the flow of the water and oxygen decomposition products from the disproportionation of the hydrogen peroxide by the catalyst 72. The second, expansion, baffle 74 has a multiplicity of perforations 75 through which the water and oxygen flow passes thereby generating a substantially turbulent flow thereof into the-combustion zone 70.

At its upstream end 76, the combustion zone 70 is provided with a spark ignition element 77 and a fuel injection nozzle 78, and downstream thereof a series of baffles 79 formed and arrange to promote further mixing of the burning fuel-oxidant mixture, as well as increasing the residence time thereof in the combustion zone 70 thereby helping to ensure complete combustion of the fuel. Finally in the vaporisation zone 71, a water injector 52 is provided for spraying water into the flow of hot combustion products exiting the combustion zone 70, the water being vaporised into steam by the latter, before the final resulting gaseous mixture is exhausted from the reaction vessel 68 via its outlet 80.

It will of course be appreciated that in order to maximise the efficiency of the process and minimise any decontamination requirements of the spent steam from the apparatus, the oxidant:fuel mixture is desirably controlled so as to be in generally stoichiometric proportions (or with a small excess of oxidant), preferably from 100 to 120%, most preferably from 100 to 110%, of the amount of oxidant relative to the stoichometric amount of oxidant required for the amount of fuel used.

Figure 6:
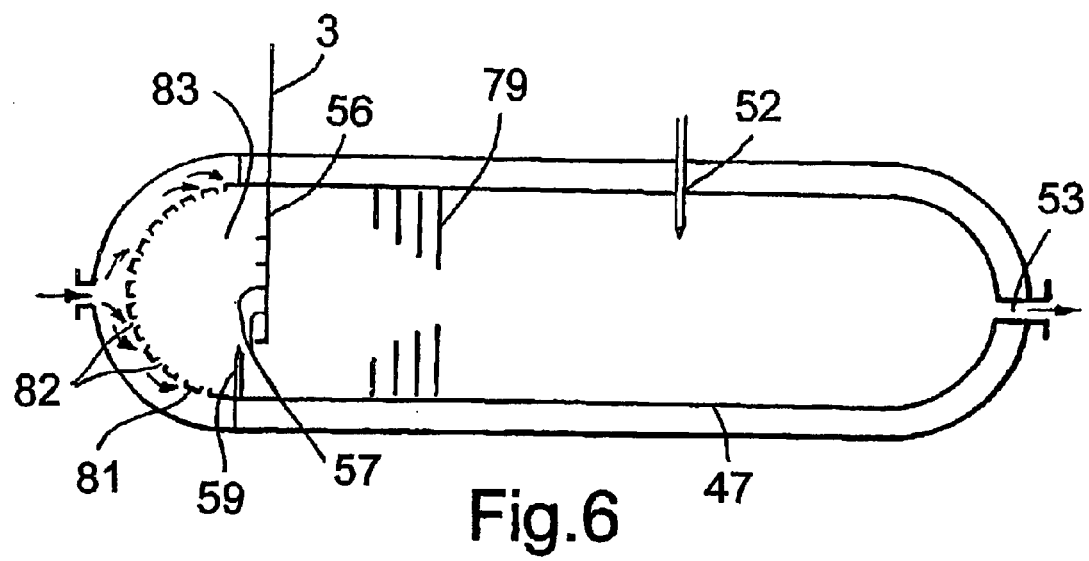
FIG. 6 is a similar view to that of FIGS. 3 to 5 of yet another embodiment.

FIG. 6 shows another embodiment similar to that of the FIG. 3 embodiment, but with certain modifications based on the FIG. 5 embodiment. The reactor vessel 46 has an inner chamber 47, which has an upstream end wall 81 with multiple spaced apart perforations 82 through which the oxidant flow is forced to enter the interior 83 of the inner chamber 47 as a turbulent flow. As with the embodiment of FIG. 3 a fuel inlet manifold 56 with an array of fuel injection nozzles 57, and a water injection supply 52 are provided. In this case though a series of baffles 79 is provided downstream of the fuel inlet manifold 56 to promote further mixing of the burning fuel-oxidant mixture etc. as in the FIG. 5 embodiment.

Figure 7:
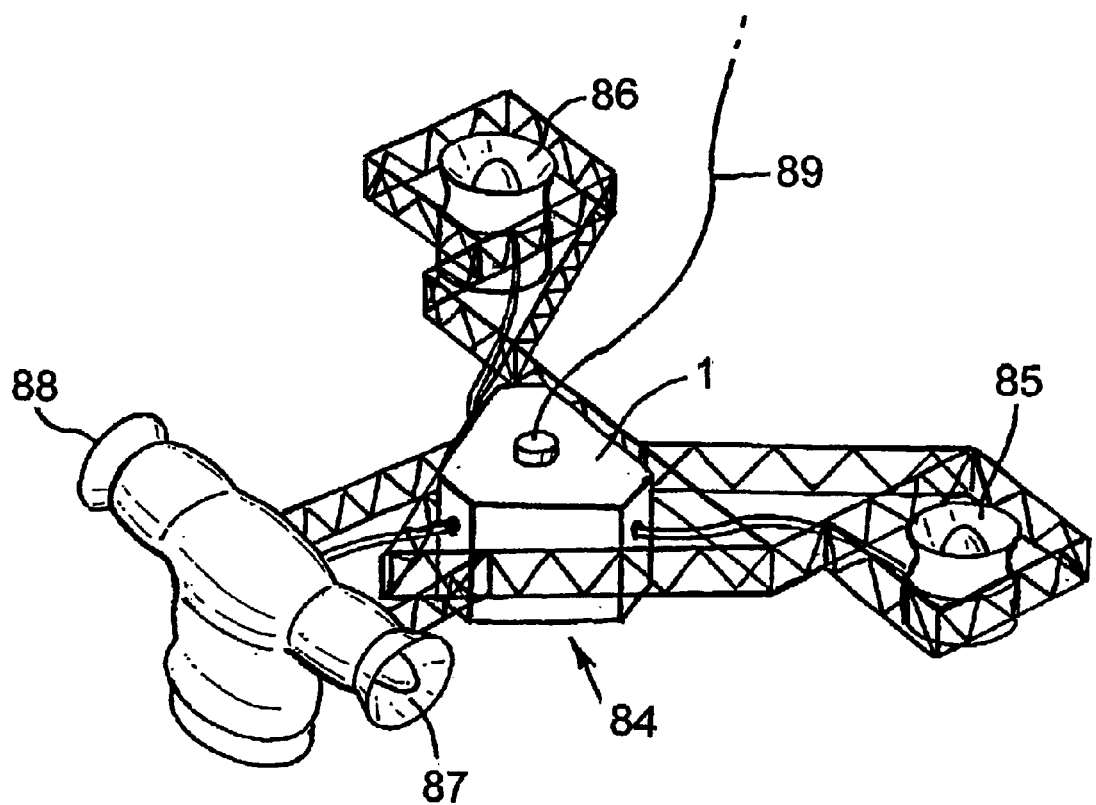
FIG. 7 is a schematic diagram of an undersea excavator ROV provided with a propulsion apparatus of the invention.

FIG. 7 shows schematically an undersea excavator/dredger ROV 84 provided with a propulsion apparatus 1 of the invention being used to drive a series of propeller type excavator units 85–88 which can be individually-tilted and have forward or reverse thrust applied to them so as to provide a driving function in addition to an excavating function. The ROV 84 is controlled via a signalling umbilical 89. In more detail the signalling umbilical 89 includes inter alia control lines 90a, 90b connected to the fuel and oxidant supply control device 12, 13 and control lines 91a, 91b etc. connected via suitable connectors 92 to the motor control valves 38 (see FIG. 2). Other signalling lines (not shown) would normally be included in generally known manner e.g. for monitoring fuel and oxidant levels in the reservoirs 10, 11, charge level of the battery 30, hydraulic pressure in the pressurised fluid chamber 28 etc. etc., and for controlling any heaters 63 provided for heating of the catalyst 62 used for inducing reaction of the fuel oxidant mixture, etc. etc.

What is claimed is:

1. A self-contained propulsion apparatus suitable for a sub-sea ROV wherein said propulsion apparatus comprises:
   a reactor vessel for reaction of hydrogen peroxide oxidant having a strength of from 20 to 70%, with a fuel, and having at least one inlet and at least one exhaust, said reactor vessel being provided with a spark ignition element;
   a decomposition chamber for disproportionation of said hydrogen peroxide oxidant upstream of said reactor vessel, said decomposition chamber being provided with a catalyst for disproportionation of said hydrogen peroxide oxidant;
   at least one reservoir for holding, in use of the apparatus, supplies of each of said fuel and hydrogen peroxide oxidant, said reservoirs being in fluid communication with said at least one inlet of said reactor vessel via said decomposition chamber;
   at least one remotely operable fuel and oxidant supply control device formed and arranged for controlling supply of said fuel and oxidant from said reservoirs to the reactor vessel;
   a steam driven drive device in fluid communication with said reactor vessel exhaust so as to be driven by steam from said reactor vessel in use of the propulsion apparatus, said drive device being connected via a reduction gear means to a propulsion device for propelling said ROV in use thereof; and
   degassing apparatus formed and arranged for substantially removing steam and any other gas phase reaction products, from the gas phase into the liquid and/or solid phase, downstream of said drive device.

2. An apparatus according to claim 1 wherein said decomposition chamber is provided in a separate decomposition vessel upstream of said reactor vessel.

3. An apparatus according to claim 1 wherein said hydrogen peroxide disproportionation catalyst is selected from a metal and a metal oxide.

4. An apparatus according to claim 1 wherein is provided a water injector connected to a water reservoir for introducing additional water into the fuel and oxidant mixture in at least one of a pre-combustion zone, combustion zone, and post-combustion zone.

5. An apparatus according to claim 4 wherein the injector is formed and arranged for introducing additional water into the mixture of reaction products from said fuel and oxidant mixture downstream of the combustion zone.

6. An apparatus according to claim 1 wherein is used said reactor vessel adapted for combustion of a fuel selected from methane, ethane, butane, methanol and ethanol.

7. An apparatus according to claim 6 where is used said reactor vessel adapted for combustion of a fuel selected from methanol and ethanol.

8. An apparatus according to claim 1 wherein is provided said degassing device for removing steam from the exhaust from the steam driven drive device, which degassing device comprises a condenser.

9. An apparatus according to claim 1 wherein is provided a scrubbing device for removing carbon dioxide from the exhaust from the steam driven drive device.

10. An apparatus according to claim 1 wherein said steam driven device is a turbine.

11. An apparatus according to claim 1 wherein the steam driven device is formed and arranged for driving a pump in a pressurized fluid circuit provided with a pressurized fluid accumulator, and a pressurized fluid operated motor drivingly coupled to the propulsion device.

12. An apparatus according to claim 11 wherein said pressurized fluid motor comprises a positive displacement motor.

13. An apparatus according to claim 11, wherein said motor has a remotely operable control device provided with a connector for coupling to said signalling umbilical.

14. An apparatus according to claim 1 wherein said propulsion device comprises at least one propellor.

15. An apparatus according to claim 1 wherein said at least one remotely operable fuel and oxidant supply control device is provided with a connector for coupling to a signalling umbilical.

16. An apparatus according to claim 1 wherein said fuel and oxidant supply control device is formed and arranged for supplying the oxidant and fuel to the combustion zone in a ratio of from 100 to 120% of the stoichiometric ratio.

17. A sub-sea Remotely Operated Vehicle having a propulsion apparatus according to claim 1.

18. A method of propulsion of a subsea ROV of the type comprising:
   a reactor vessel for reaction of hydrogen peroxide oxidant having a strength of from 20 to 70%, with a fuel, and having at least one inlet and at least one exhaust, said reactor vessel being provided with a spark ignition element;
   a decomposition chamber for disproportionation of said hydrogen peroxide oxidant upstream of said reactor vessel, said decomposition chamber being provided with a catalyst for disproportionation of said hydrogen peroxide oxidant;
   at least one reservoir for holding, in use of the apparatus, supplies of each of said fuel and hydrogen peroxide oxidant, said reservoirs being in fluid communication with said at least one inlet of said reactor vessel via said decomposition chamber;
   at least one remotely operable fuel and oxidant supply control device formed and arranged for controlling supply of said fuel and oxidant from said reservoirs to the reactor vessel;
   a steam driven drive device in fluid communication with said reactor vessel exhaust so as to be driven by steam from said reactor vessel in use of the propulsion apparatus, said drive device being connected via a reduction gear means to a propulsion device for propelling said ROV in use thereof; and
   degassing apparatus formed and arranged for substantially removing steam and any other gas phase reaction products, from the gas phase into the liquid and/or solid phase, downstream of said drive device;
   said method comprising the steps of:
   a) charging each said at least one reservoir with supplies of said fuel and said hydrogen peroxide oxidant, respectively;
   b) disproportionating said hydrogen peroxide oxidant in said decomposition chamber;
   c) supplying said fuel and disproportionated hydrogen peroxide oxidant to the reactor vessel via said fuel and oxidant supply control device, and reacting them therein;

d) driving said steam driven device by steam from said reactor vessel so as to propel said ROV; and e) substantially removing steam and any other gas phase reaction products, from the gas phase into the liquid and/or solid phase, in said degassing apparatus.

19. A method according to claim 18, comprising the further step of providing said hydrogen peroxide oxidant at a strength of from 20 to 60%.

20. A method according to claim 18, comprising the further step of providing said hydrogen peroxide oxidant at a strength of from 30 to 50%.

21. A method according to claim 18, comprising the further step of selecting said fuel from a group consisting of methanol, ethanol and mixtures thereof.

* * * * *